Nov. 6, 1928.

E. L. CHAFFEE ET AL 1,690,719

METHOD AND MEANS FOR SECRET RADIOSIGNALING

Original Filed March 31, 1922  4 Sheets-Sheet 2

Inventors
Emory Leon Chaffee
Ellison S. Purington
By their Attorney
A. I. Gardner Nov. 6, 1928.

E. L. CHAFFEE ET AL 1,690,719

METHOD AND MEANS FOR SECRET RADIOSIGNALING

Original Filed March 31, 1922    4 Sheets-Sheet 3

Inventors
Emory Leon Chaffee
Ellison S. Purington
By their Attorney
A. I. Gardner Inventors
Emory Leon Chaffee
Ellison S. Purington
By their Attorney
A. J. Gardner Patented Nov. 6, 1928.

1,690,719

UNITED STATES PATENT OFFICE.

EMORY LEON CHAFFEE, OF BELMONT, AND ELLISON S. PURINGTON, OF BOSTON, MASSACHUSETTS, ASSIGNORS TO JOHN HAYS HAMMOND, JR., OF GLOUCESTER, MASSACHUSETTS.

METHOD AND MEANS FOR SECRET RADIOSIGNALING.

Application filed March 31, 1922, Serial No. 548,513. Renewed March 16, 1926.

Some of the objects of the present invention are to provide an improved method of transmitting radiant signaling energy; to provide improvements in means for transmitting radiant signaling energy; to provide an improved method of receiving radiant signaling energy; to provide improvements in means for receiving radiant signaling energy; to provide an improved system of communication by radiant energy whereby increased secrecy is afforded; and to provide other objects which will appear in the following description taken in connection with the accompanying drawings.

Referring to the drawings.

Figure 6:
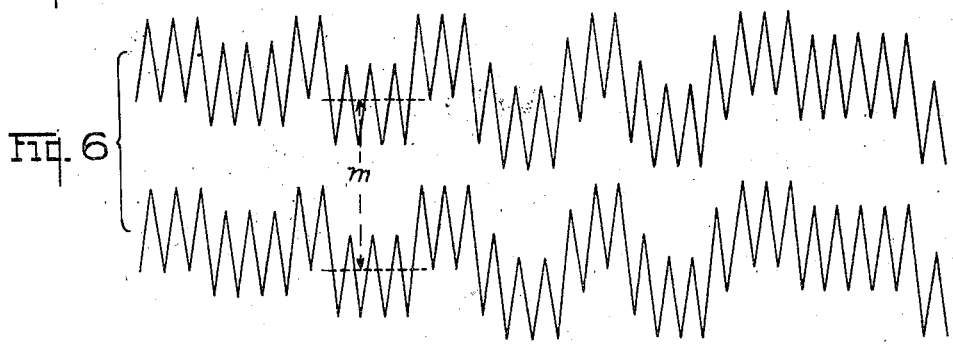
Fig. 6 is a chart showing the total wobble patterns produced by the currents charted in the two parts of Fig. 3 in combination with Figs. 4 and 5 respectively.
Figure 7:
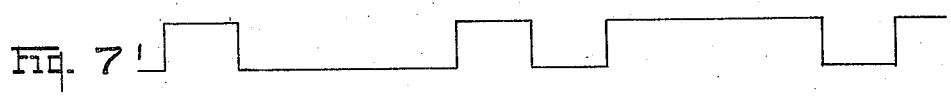
Fig. 7 is a chart showing the true message in duplicate.
Figure 8:
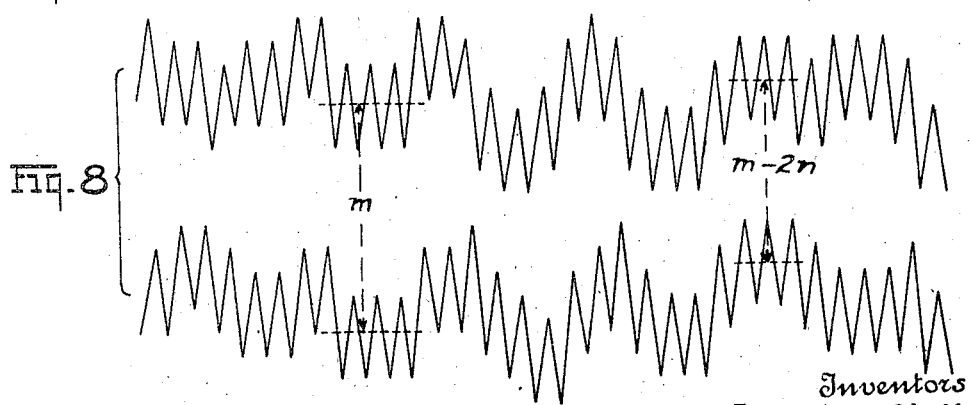
Figure 9:
Figure 10:

Fig. 8 corresponds to Fig. 6 except that the differences between the two portions of the chart are proportional to the message current charted in Fig. 7;

Fig. 9 is a chart of the beat note pattern produced at the receiving station by the total wobble pattern due to the artificial and message wobble (Figs. 6 and 7) in combination with heterodynes producing currents of frequencies substantially midway of the wobble range;

Fig. 10 gives the differences between the two portions of Fig. 8; and

Figure 11:
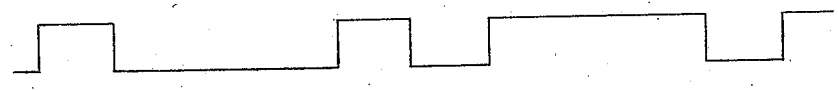

Fig. 11 is the envelope of Fig. 10.

Figure 1:
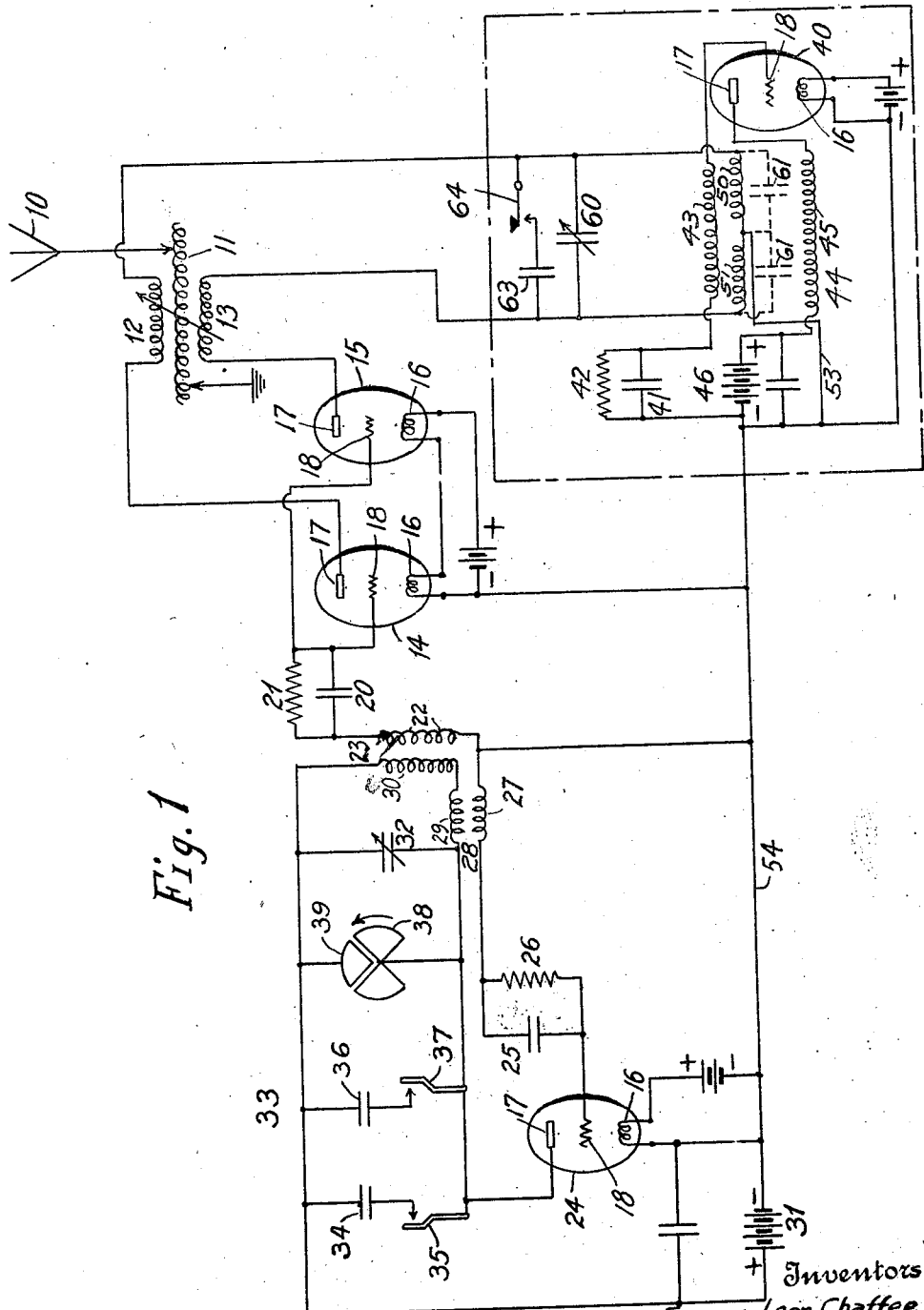
Figure 1 shows diagrammatically one form of transmitting station embodying the features of our invention.

Referring to the drawings and more particularly to Fig. 1, there is shown a transmitting station comprising an antenna 10 connected to earth through a winding of a coupling 11. The coupling 11 has a pair of primary windings 12 and 13. The winding 12 is included in the plate circuit of a three-electrode vacuum tube or thermionic valve 14. Similarly, the winding 13 is included in the plate circuit of a second three-electrode vacuum tube or thermionic valve 15. Each of the devices 14, 15 comprises an evacuated bulb having a heated filament 16 forming a hot cathode to cause emission of electrons, a plate anode 17 upon which the electrons impinge and a grid 18 for controlling the passage of the electrons.

The grids 18 of the devices 14 and 15 are connected together and to a grid condenser 20 having a usual leak 21 comprising a non-inductive resistance of approximately 10,-000 ohms. The circuit of these grids also includes a winding 22 of a coupling 23, whereby said circuit is inductively coupled to the circuit of a usual three-electrode thermionic device 24. The grid of the device 24 is connected through a suitable condenser 25, shunted by a so-called grid leak 26, to a secondary winding 27 of a second coupling 28.

The plate of the device 24 is connected to the primary winding 29 of the coupling 28, the primary winding 30 of the coupling 23, and a plate potential battery or D. C. generator 31 in series. In shunt with the windings 29 and 30 collectively is an adjustable condenser 32 of conventional construction, and also a wobbler mechanism 33. The wobbler mechanism comprises mechanically driven means for periodically varying additional capacities in shunt with the windings 29 and 30. One of these capacities 34 is intermittently connected into circuit by a contact arm 35, and another capacity 36 is connected into circuit periodically by a contact arm 37. Another variable capacity consists of a rotatable, double segment 38 operating in close proximity to a relatively fixed, arcuate segment 39.

Plate power for the electron devices 14 and 15 is supplied by an additional three-electrode, thermionic device 40. Included in the grid circuit of the last named device 40 is a usual grid-condenser 41 and grid leak 42, and a winding 43 of a coupling 44. The plate circuit of the device 40 includes a second winding 45 of the coupling 44 and a usual plate potential battery 46. The plate potential may be supplied, if desired, by a suitable D. C. generator in place of the battery 46.

A pair of windings 50, 51 of the coupling 44 inductively coupled to the windings 43, 45 thereof are connected respectively to the windings 12 and 13 of the coupling 11. The windings 43 and 45 are coupled closely to the windings 50 and 51 but loosely to each other. A common conductor 53 joins one terminal of each of the windings 50, 51 to the stabilizing or return wire 54 of the system.

The potential stabilizing conductor 54 interconnects the various negative terminals of the several thermionic devices of the transmitting system, and may be connected to a ground (not shown) for maintaining zero potential above ground thereon.

For determining the frequency of the oscillation generator 40, there is provided an adjustable condenser 60 in shunt with the windings 50, 51 collectively. The electrical characteristics of the closed, oscillatory circuit which includes the windings 50, 51 and the condenser 60 may be adjusted to cause the generator 40 to produce oscillations of a desired frequency $m$. In shunt with each of the windings 50, 51 there may be provided, if desired, a by-pass condenser such as 61, of relatively low electrostatic capacity; under certain conditions, however, the capacity between the adjacent turns of the windings 50, 51 is sufficient, and this capacity is represented by the condensers being dotted to assist in a ready understanding of the drawings.

For varying the frequency of the oscillations produced by the device 40, there is included a condenser 63 and a control key or switch 64. When the key 64 is closed, the condenser 63 is connected in shunt with the variable condenser 60, and thus the frequency may readily and conveniently be varied by an amount which may be represented herein by $n$. With the arrangement shown the frequency of the current produced by the generator 40 is reduced on closing of key 64. However, closing of key 64 might be caused to increase the frequency of generator 40 without departing from the invention.

Figure 2:
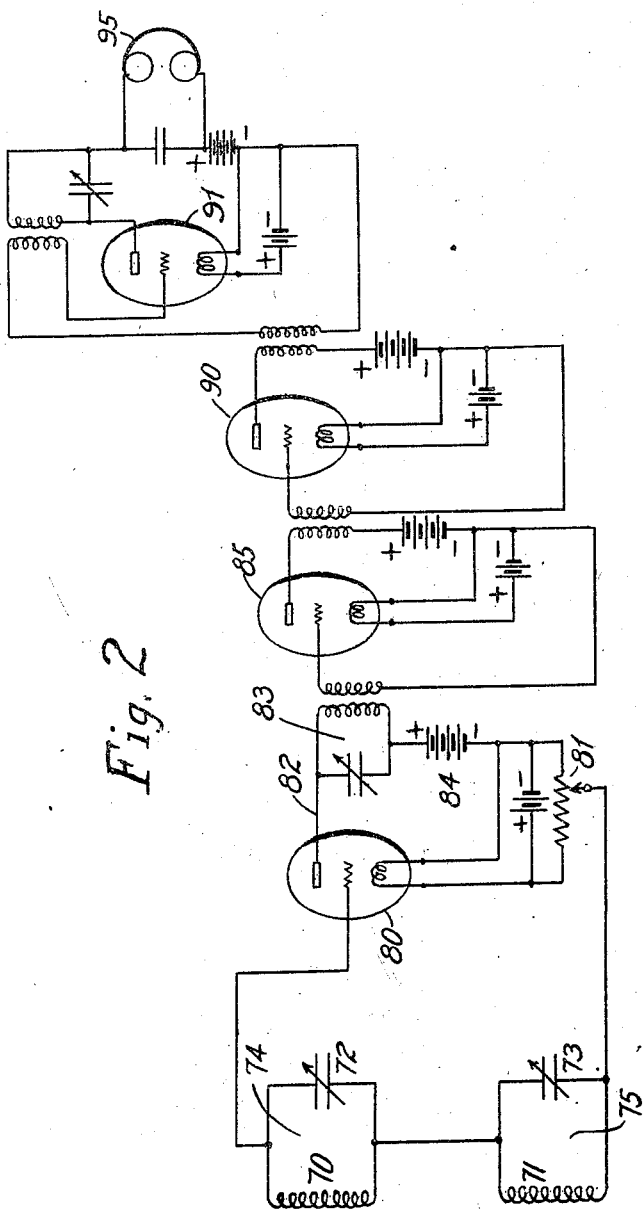
Fig. 2 shows diagrammatically one form of receiving station for receiving radiant energy according to the invention.

The receiving system shown in Fig. 2 includes a pair of receiving loops 70, 71 adapted to receive radiant energy from the direction in which the antenna 10 of the transmitting system lies relative to the receiving station. The electrical resonance of these loops may be adjusted by a corresponding pair of variable condensers 72, 73 connected in shunt with the loops, respectively, and forming therewith a pair of closed oscillatory circuits 74, 75. The condensers 72 and 73 of the closed, oscillatory circuits 74 and 75 are adjusted so that the receiving loops 70 and 71 in the input circuit of the thermionic device 80 are caused to be selectively responsive to two series of oscillations radiated from the transmitter. Selective reception of the transmitted oscillations by loops 70 and 71 is not prevented by the wobbling of the frequency of each of the series of oscillations so long as the oscillations are not wobbled through an excessively large range. For instance, satisfactory reception can be obtained with the receiving system shown in Fig. 2, where the frequencies of the oscillations approximate 1,000,000 cycles per second, and wobbling of the respective frequencies is effected through a range of 5,000 cycles per second.

For detecting, rectifying or amplifying the received energy, there is provided a three electrode, thermionic device 80. The grid circuit of the device 80 includes the two oscillatory circuits 74 and 75 in series, and a portion of a potentiometer 81, whereby the grid potential may be varied as desired.

The arrangement is such that rectified impulses are produced in the output circuit of the device 80, which includes a conductor 82, a closed oscillatory circuit 83, and a usual source of plate potential 84. The circuit 83 is preferably tuned to the difference between the transmitted waves when the key 64 is closed, that is, to a frequency $2m-2n$, and its tuning may be varied in a well known manner as by a variable condenser. The circuit 83 may be coupled to the grid circuit of a second, three electrode thermionic device 85 by means of any desired method of coupling, as for example, resistance, capacitative or inductive. As shown, an inductive coupling is employed.

The output circuit of the device 85 may be similarly coupled to the input of a third, three-electrode thermionic device 90 and the output circuit thereof to the input of a fourth thermionic device 91. The arrangement illustrated is a so-called cascade arrangement of vacuum tubes, and may be varied in its arrangement without departing from the spirit of the invention. For example, the number of tubes in the series may be reduced or increased by a desired number, in a manner obvious to those skilled in the art.

The final device 91 is arranged as a so-called autodyne whereby regenerative, continuous oscillations are produced in its circuit, causing beats with the original impressed oscillations. Currents of the beat frequencies may be arranged to actuate a telephone receiver 95 as shown, or any desired controlled device may be used.

In the following description, algebraic symbols will be employed for indicating certain values, and by way of example a specific value thereof will be given to illustrate one way in which the invention may be practised.

Figure 3:
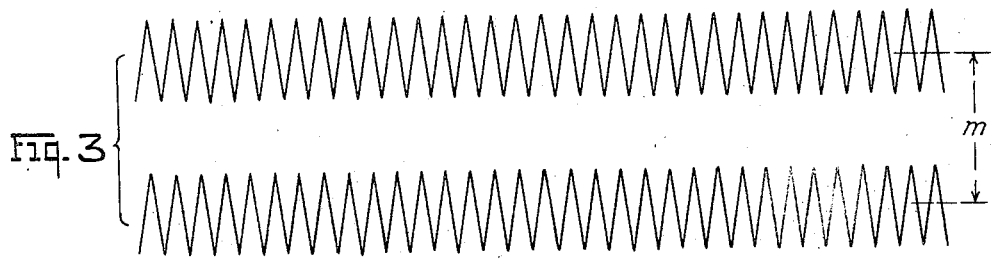
Fig. 3 is a chart showing typical variations in frequencies of currents produced by the system of Fig. 1.

With the varying capacity 38, 39 of the wobbler 33 in operation, but the contacts 35 and 37 thereof inactive, the circuit of Fig. 1 produces in the antenna 10 two series of oscillations the frequencies of which vary as shown in Fig. 3, the two curves of which represent changes in frequency of the two series of oscillations respectively and are spaced apart by an amount dependent equal to twice the frequency of the oscillating device 40. It may be further observed that the curves of Figure 3 are not representations of sine wave oscillations, but that, on the contrary, the ordinate of Figure 3 represents frequency only. In other words, Figure 3 is based on a plan which, if it were not for the fan wobbler 38, 39, would call for two straight lines indicating that two waves or series of oscillations are being radiated of frequencies which are unchanged over the period of time recorded. Operation of the wobbler 38, 39, however, cyclically varies the frequency of each of the waves gradually through a predetermined range, and these cyclical variations in frequency follow the curves shown in Figure 3.

Figure 4:
Fig. 4 is a chart showing an artificial wobble produced by a portion of the wobbler of Fig. 1.

The capacity 34 is selected so that with all other conditions constant, the frequency of oscillation of the device 24 will be varied by a value $f$ by connecting the capacity 34 into circuit. The contact 35 controls this connection, and is arranged to open and close the connection in accordance with a dash and dot pattern, such as shown in Fig. 4.

Figure 5:
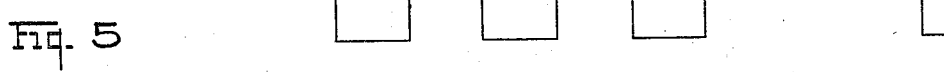
Fig. 5 is a chart showing a second wobble produced by a different portion of the wobbler of Fig. 1.

The capacity 36 is selected so that with all other conditions constant, the frequency of oscillation of the device 24 will be varied by a value $g$ by connecting the capacity 36 into circuit. The capacity 36 should preferably be different from 34, so that the frequency change $g$ will be different from $f$. The contact 37 controls the connection of the capacity 36 into circuit, and is arranged to open and close the connection in accordance with a dash and dot pattern such as shown in Fig. 5. The diagrammatic representation assumes that the capacity 36 is greater than capacity 34.

Numerical values according to the following table may be assigned to the algebraic symbols mentioned by way of example, but it is expressly understood that the scope of the invention is not to be limited thereby.

$f = 500.$
$g = 1,000$ ($g$ does not $= f$).
$m = 10,500.$
$n = 500.$

Any usual radio frequency may be employed, preferably relatively high compared with the value "$m$." With the wobbler 33 and key 64 inactive, the master tube 24 produces oscillations locally which approximate the radio frequency to be used. Means including the couplers 11 and 44 and the tube 40 modify these oscillations and there result therefrom two series of oscillations impressed upon the ether, each series of which differs in frequency from the master-circuit oscillation frequency by an amount $m$.

In the operation of the transmitting station of Fig. 1, the entire wobbler 33 being in operation, there are produced in the antenna, co-existing currents whose frequency variations are shown in Fig. 6. The two portions are similar in shape, the shape being determined by the summation of the effects of the elements 35, 37 and 38 of the wobbler 33 upon the master circuit frequency.

The true message is now transmitted by operating the key 64 in accordance therewith. This decreases the difference frequency, because closure of the key 64 connects into circuit the capacity 63, which decreases the period of oscillation of the device 40 by the amount $n$. The message variation is indicated diagrammatically in Fig. 7.

The variations in frequencies of the oscillatory energy impressed upon the ether while transmitting the message, are shown diagrammatically in Fig. 8. Here the two curves differ from one another by an amount $2m$ when the key 64 is in its open position, but by an amount $2m-2n$ when the key 64 is in its closed position. The frequency $2m-2n$ is preferably above audibility.

Reception by means of a circuit using an ordinary detector or rectifier is not possible since the difference frequencies $2m$ and $2m-2n$ are super-audible.

To indicate that the true message cannot be read by beat reception there is shown in Fig. 9 the sequence of beat tones due to the artificial wobble of Fig. 6 and the message wobble of Fig. 7. This curve shows the beat note obtained by tuning the local autodyne or heterodyne of an ordinary receiving set to a frequency midway of the range of the lower part of Fig. 8. Similarly the true message cannot be read by tuning to the other wobbled frequency shown in the upper part of Fig. 8 nor by any other adjustment of the receiver.

Thus it is apparent that it is impossible to receive the true message at a receiving station of a form heretofore generally employed.

It will be apparent from the foregoing that the receiving station of Fig. 2 is arranged to be responsive to changes in the difference between the frequencies of oscillations received by the loops 70 and 71. The differences are shown diagrammatically in Fig. 10 in which each vertical line represents the respective difference between the curve of the upper part of Fig. 8 and that of the lower part.

The envelope of the difference frequencies is indicated in Fig. 11. Its similarity to the true message of Fig. 7 is obvious. The autodyne 91 of Fig. 2 is tuned so as to produce beats of audible frequency and thus the device 95 produces the signal of Fig. 11.

The construction illustrated and described herein is merely what we now consider to be the preferred embodiment of our invention and it is therefore to be distinctly understood that we do not limit ourselves thereto as many changes may be made in point of detail, and other embodiments than those shown may be resorted to without deviating from the true spirit and scope of our invention as defined by the appended claims.

What is claimed is:

1. The method of producing radiant energy for the transmission of intelligence which comprises generating a pair of alternating currents of unlike frequencies, wobbling said currents similarly so that the frequency difference thereof normally remains substantially constant, and transmitting a message by varying said difference frequency.

2. The method of producing radiant energy for transmitting intelligence which comprises generating a pair of alternating currents of unlike frequencies, wobbling said currents similarly so that the frequency difference thereof normally remains substantially constant, and transmitting a message by manually varying said difference frequency.

3. The method of producing radiant energy for transmission of intelligence which comprises generating a pair of alternating currents of unlike frequencies, wobbling said currents similarly so that the frequency difference thereof normally remains substantially constant, changing said difference frequency to transmit a signal and maintaining said changed difference frequency substantially constant for the duration of a signal.

4. In a system for the transmission of intelligence, means for generating two wobbled alternating currents having frequencies normally differing from each other by a substantially constant amount, and means for modifying said difference to transmit a signal arranged to maintain said modified difference substantially constant for the duration of a signal.

5. The method of transmitting intelligence which comprises transmitting two alternating currents of unlike frequencies, normally maintaining the difference between said frequencies substantially constant while varying the said frequencies, and changing said frequencies to change the difference for transmitting a message.

6. The method of transmitting intelligence which comprises transmitting two wobbled series of oscillations of unlike frequencies normally differing from each other by a substantially constant amount, changing said difference in accordance with a message, selectively receiving said series of oscillations and producing an indication by the combined action of said series of oscillations.

7. The method for producing radiant energy for the transmission of intelligence which comprises generating two series of oscillations having frequencies differing from each other by an amount above good audibility, wobbling said series of oscillations similarly, so that the frequency difference thereof remains substantially constant and within a predetermined, relatively narrow frequency range transmitting a message by modifying said difference frequency, selectively receiving said series of oscillations, beating said oscillations together and detecting them to produce a current of a frequency equal to the difference between the frequencies of said series of oscillations, and detecting and indicating said current.

8. The method of producing radiant energy for the transmission of intelligence which comprises generating two alternating currents of unlike frequency, wobbling said currents similarly so that the frequency difference thereof normally remains substantially constant, and transmitting a message by modifying the frequencies of said currents to change the frequency difference.

9. The method of producing radiant energy for transmitting intelligence which comprises generating a pair of alternating currents of unlike frequencies, wobbling said currents similarly so that the frequency difference thereof remains substantially constant, and transmitting a message my manually modifying the frequencies of said currents to produce a different difference frequency.

10. A system for transmitting radiant energy, comprising means for producing local radio oscillations, means for wobbling the frequency of said oscillations, means for producing therefrom and impressing on the ether a plurality of series of waves having frequencies differing from the frequency of the first named oscillations by substantially equal and normally substantially constant amounts and from each other by substantially twice that amount, and means for varying said differences.

11. A system for transmitting radiant energy, comprising means for producing local radio oscillations, means for wobbling the frequency of said oscillations, means for producing therefrom and impressing on the ether a plurality of series of waves having frequencies differing from each other by a normally constant amount, and manually operative means for varying said difference for transmitting a message.

12. A system for transmitting radiant energy, comprising means for producing local radio oscillations varying in frequency, means for producing therefrom and impressing on the ether two series of waves having frequencies differing from the frequency of the first named oscillations by substantially equal amounts and from each other by a substantially constant amount, and means for varying said differences.

13. A system for transmitting radiant energy, comprising means for producing local radio oscillations varying in frequency at a predetermined rate, means for producing therefrom and impressing on the ether two series of waves having frequencies differing from the frequency of the first named oscillations by substantially equal amounts and from each other by a substantially constant amount, and means for transmitting a signal comprising means for varying said differences.

14. A system for transmitting radiant energy, comprising means for producing local radio oscillations varying in frequency at a predetermined rate, means for producing therefrom and impressing on the ether two series of waves having a normally constant difference in frequency and differing from the frequency of the first named oscillations by substantially equal amounts, and means for transmitting a signal comprising means for reducing the difference in frequency between said series of waves.

15. A system for transmitting radiant energy, comprising means for producing local radio oscillations, means for varying the frequency of said oscillations in a plurality of sequences, and means for producing from said oscillations and impressing on the ether two series of waves having frequencies differing from the frequency of the first named oscillations by substantially equal amounts and from each other by substantially twice that amount, and manually operative means to reduce said differences to transmit a signal.

16. A system for transmitting radiant energy, comprising means for producing local radio oscillations, means for varying the frequency of said oscillations, separate means for varying the frequency of said oscillations in accordance with a false message pattern, means for producing therefrom and impressing on the ether two series of waves having frequencies differing from the frequency of the first named oscillations by substantially equal amounts and from each other by substantially twice that amount, and means for varying said differences according to a true message pattern.

17. A system for transmitting radiant energy, comprising means for producing local radio oscillations, means for varying the frequency of said oscillations, separate means for varying the frequency of said oscillations in accordance with a plurality of false message patterns of unlike character, means for producing therefrom and impressing on the ether two series of waves having frequencies differing from the frequency of the first named oscillations by substantially equal amounts and from each other by substantially twice that amount, and means for varying said differences according to a true message pattern.

18. A system for transmitting radiant energy, comprising means for producing oscillations of radio frequency, means for producing a plurality of series of oscillations therefrom differing in frequency from said oscillations and from each other, means for impressing the last named series of oscillations upon the ether, means for varying said frequency differences to transmit desired signals, and receiving means constructed to utilize said frequency differences for reception of the signals.

19. A system for transmitting radiant energy, comprising means for producing oscillations of radio frequency, means for producing a plurality of series of oscillations therefrom differing in frequency from said oscillations and from each other, means for impressing the last named series of oscillations upon the ether, manually operative means for varying the difference, in frequency between a plurality of said series of oscillations to transmit desired signals, and receiving means constructed to utilize said difference in frequency.

20. A system for transmitting radiant energy, comprising means for producing alternating current of radio frequency, means for wobbling said current, means for producing a plurality of series of oscillations therefrom differing in frequency from said current and from each other by substantially constant amounts, means for impressing the last named series of oscillations upon the ether, and manually operative means for varying the difference frequencies for transmitting a message.

21. A system for transmitting radiant energy, comprising means for producing oscillations of radio frequency continually varying in frequency, means for producing a plurality of series of oscillations therefrom differing in frequency from said oscillations and from each other, means for impressing the last named series of oscillations upon the ether, and means for varying said differences according to a true message pattern.

22. A system for transmitting radiant energy, comprising means for producing oscillations of radio frequency continually varying in frequency at a predetermined rate, means for producing a plurality of series of oscillations therefrom differing in frequency from said oscillations and from each other, means for impressing the last named series of oscillations upon the ether, and means for varying said differences according to a true message pattern.

23. A system for transmitting radiant energy, comprising means for producing oscillations of radio frequency continually varying in frequency at a predetermined rate for a period and then changing the rate of change, means for producing a plurality of series of oscillations therefrom differing in frequency from said oscillations and from each other, means for impressing the last named series of oscillations upon the ether, and means for varying said differences according to a true message pattern.

24. A system for transmitting radiant energy, comprising means for producing oscillations of radio frequency continually varying in frequency at a predetermined rate for a period and then intermittently varying the rate of change, means for producing a plurality of series of oscillations therefrom differing in frequency from said oscillations and from each other, means for impressing the last named series of oscillations upon the ether, and means for varying said differences according to a true message pattern.

25. A system for transmitting radiant energy, comprising means for producing oscillations of radio frequency continually varying in frequency at a predetermined rate for a period and then intermittently varying the rate of change in accordance with a false message pattern, means for producing a plurality of series of oscillations therefrom differing in frequency from said oscillations and from each other, means for impressing the last named series of oscillations upon the ether, and means for varying said differences according to a true message pattern.

26. A system for transmitting radiant energy, comprising means for producing oscillations of radio frequency continually varying in frequency at a predetermined rate for a period and then intermittently varying the rate of change in accordance with a plurality of false message patterns of unlike character, means for producing a plurality of series of oscillations therefrom differing in frequency from said oscillations and from each other, means for impressing the last named series of oscillations upon the ether, and means for varying said differences according to a true message pattern.

27. A system for the transmission of radiant energy comprising means for producing locally oscillations of a high frequency, means for wobbling the frequency of said oscillations, means for producing therefrom and impressing on the ether a plurality of series of waves having frequencies differing from the frequency of the first named oscillations by substantially equal and normally substantially constant amounts, and means for transmitting a signal comprising means for varying said differences.

28. A system for the production of radiant energy comprising means for producing two wobbled currents normally differing from each other by a substantially constant amount, and means for varying said difference.

29. A system for the production of radiant energy comprising means for producing two wobbled currents normally differing from each other by a substantially constant amount, and manually operable means for varying said difference for transmitting a message.

In testimony whereof we hereunto affixed our signatures.

EMORY LEON CHAFFEE.
ELLISON S. PURINGTON.